United States Patent
Sun et al.

(10) Patent No.: US 8,926,938 B2
(45) Date of Patent: Jan. 6, 2015

(54) METHOD OF PREPARING CRYSTALLINE TITANIUM DIOXIDE POWDER, METHOD OF PREPARING A NEGATIVE ACTIVE MATERIAL, NEGATIVE ACTIVE MATERIAL, AND RECHARGEBALE LITHIUM BATTERY

(75) Inventors: Yang-Kook Sun, Seoul (KR); Ce Jin, Seoul (KR); Hun-Gi Jung, Busan (KR); Sung-Woo Oh, Seoul (KR)

(73) Assignee: IUCF-HYU (Industry-University-Cooperation Foundation Hanyang University), Seoul (KR)

( * ) Notice: Subject to any disclaimer, the term of this patent is extended or adjusted under 35 U.S.C. 154(b) by 770 days.

(21) Appl. No.: 13/143,944

(22) PCT Filed: Jan. 13, 2010

(86) PCT No.: PCT/KR2010/000211
§ 371 (c)(1),
(2), (4) Date: Jul. 11, 2011

(87) PCT Pub. No.: WO2010/082761
PCT Pub. Date: Jul. 22, 2010

(65) Prior Publication Data
US 2011/0269025 A1    Nov. 3, 2011

(30) Foreign Application Priority Data

Jan. 13, 2009 (KR) .................. 10-2009-0002576
Jan. 13, 2009 (KR) .................. 10-2009-0002577
Jan. 12, 2010 (KR) .................. 10-2010-0002793

(51) Int. Cl.
*C01G 23/047* (2006.01)
*H01M 4/48* (2010.01)
*H01M 4/131* (2010.01)
*H01M 4/1391* (2010.01)
*H01M 4/36* (2006.01)
*H01M 4/485* (2010.01)
*H01M 10/052* (2010.01)

(52) U.S. Cl.
CPC ............ *H01M 4/48* (2013.01); *H01M 4/04713* (2013.01); *H01M 4/131* (2013.01); *H01M 4/1391* (2013.01); *H01M 4/366* (2013.01); *H01M 4/485* (2013.01); *H01M 10/052* (2013.01); *Y02E 60/122* (2013.01)
USPC .............................. 423/611; 423/81; 423/612

(58) Field of Classification Search
None
See application file for complete search history.

(56) References Cited

U.S. PATENT DOCUMENTS

2004/0151662 A1 * 8/2004 Yoshida et al. ............... 423/611

FOREIGN PATENT DOCUMENTS

| JP | 07-316536 | 12/1995 |
| JP | 2000-302547 | 10/2000 |
| JP | 2008-273832 | 11/2008 |
| KR | 10-2008-0023831 | 3/2008 |

OTHER PUBLICATIONS

Machine translation of KR 1020080023831, Yoon et al., Mar. 2008.*

* cited by examiner

*Primary Examiner* — Steven Bos
(74) *Attorney, Agent, or Firm* — Lexyoume IP Meister, PLLC

(57) ABSTRACT

A method of manufacturing crystalline titanium dioxide ($TiO_2$) powder, a method of a negative active material, and a negative active material and a rechargeable lithium battery including the crystalline titanium dioxide ($TiO_2$) powder are provided. The method of manufacturing the crystalline titanium dioxide powder may include: preparing a titanyl chloride ($TiOCl_2$) aqueous solution by adding titanium tetrachloride ($TiCl_4$) to water at a temperature ranging from 0° C. to 10° C.; adding alcohol, urea, and a sphere-shaping agent to the titanyl chloride aqueous solution to prepare a mixture; and hydrothermally synthesizing the mixture under a pressure ranging from 1.5 atm to 5 atm at a temperature ranging from 80° C. to 155° C.

10 Claims, 22 Drawing Sheets

METHOD OF PREPARING CRYSTALLINE TITANIUM DIOXIDE POWDER, METHOD OF PREPARING A NEGATIVE ACTIVE MATERIAL, NEGATIVE ACTIVE MATERIAL, AND RECHARGEBALE LITHIUM BATTERY

TECHNICAL FIELD

This disclosure relates to a method of preparing crystalline titanium dioxide ($TiO_2$) powder, a method of preparing a negative active material, a negative active material, and a rechargeable lithium battery.

BACKGROUND ART

A portable device becomes lighter and smaller according to development of electronic technology, and accordingly, requires a smaller and lighter high performance rechargeable battery with high energy characteristics as an energy source. As for the rechargeable battery, a rechargeable lithium battery has a high voltage of 3V or higher and high energy density, and thus has been paid the most attention to.

This rechargeable lithium battery consists of positive and negative electrodes, an electrolyte, a separator, an exterior material, and the like. The positive electrode may include a lithium transition element compound such as $LiCoO_2$, $LiMn_2O_4$, $LiNiO_2$, $LiMnO_2$, and the like as a positive active material.

As for a negative active material, carbon has been widely used, but a lithium titanate negative active material with better safety and very small irreversible capacity has been recently paid more attention to. This lithium titanate has an operation voltage ranging from 1.3 to 1.6 V, and thus almost no irreversible reaction, and also has excellent safety due to very low reaction heat compared with a conventional carbon-based negative active material. In addition, while a carbon negative active material has a low theoretical density of about 2 g/cc, lithium titanate has a high theoretical density of 3.5 g/cc and thus high energy density per volume. Accordingly, lithium titanate has recently drawn attention as an alternative for a conventional carbon negative active material in order to be applied to a medium- or large-sized rechargeable lithium battery for an electric vehicle or an electric power storage system.

This lithium titanate may be prepared by using titanium dioxide ($TiO_2$) as a starting material. Recently, in order to improve properties of a lithium titanate negative active material, titanium dioxide itself, a starting material of the lithium titanate, has been researched regarding improving properties.

DISCLOSURE

Technical Problem

One aspect of the present invention provides a method of manufacturing crystalline titanium dioxide powder, which can reproducibly adjust particle size and shape of the crystalline titanium dioxide powder using a hydrothermal synthesis method.

Another aspect of the present invention provides a method of manufacturing a negative active material for a rechargeable lithium battery by using the crystalline titanium dioxide powder.

Still another aspect of the present invention provides a rechargeable lithium battery fabricated by using the negative active material.

Another aspect of the present invention provides a rechargeable lithium battery including the negative active material.

Technical Solution

According to one aspect of the present invention, a method of manufacturing crystalline titanium dioxide powder is provided, which includes: preparing a titanyl chloride ($TiOCl_2$) aqueous solution by adding water at a temperature ranging from 0° C. to 10° C. to a titanium tetrachloride ($TiCl_4$) solution; preparing a mixture by adding alcohol, urea, and a sphere-shaping agent to the titanyl chloride aqueous solution; and hydrothermally synthesizing the mixture under a pressure ranging from 1.5 atm to 5 atm at a temperature ranging from 80° C. to 155° C.

According to another aspect of the present invention, a negative active material for a rechargeable lithium battery is provided, which includes crystalline titanium dioxide prepared in the aforementioned method.

Another aspect of the present invention provides a negative active material for a rechargeable lithium battery, which is prepared by using crystalline titanium dioxide prepared in the above method and represented by the following Chemical Formula 1.

  [Chemical Formula 1]

In Chemical Formula 1, $3.8 \leq x \leq 4.2$, $4.8 \leq y \leq 5.2$, and $11.8 \leq z \leq 12.2$.

Still another aspect of the present invention provides a method of manufacturing a negative active material of the following Chemical Formula 1 for a rechargeable lithium battery, which includes mixing a crystalline titanium dioxide prepared in the above method with a carbon precursor liquid and a lithium-containing material, and heat-treating the mixture.

  [Chemical Formula 1]

In Chemical Formula 1, $3.8 \leq x \leq 4.2$, $4.8 \leq y \leq 5.2$, and $11.8 \leq z \leq 12.2$.

Yet another aspect of the present invention provides a method of manufacturing a negative active material of the above Chemical Formula 1 for a rechargeable lithium battery, which includes: preparing a titanium dioxide-carbon liquid by mixing the crystalline titanium dioxide with a carbon precursor liquid; drying the titanium dioxide-carbon liquid to prepare titanium dioxide with a carbon layer; mixing titanium dioxide with the carbon layer with a lithium-containing material; and heat-treating the mixture.

Still another aspect of the present invention provides a rechargeable lithium battery including a negative electrode including the negative active material, a positive electrode including a positive active material, and a non-aqueous electrolyte.

Hereinafter, further embodiments of the present invention will be described in detail.

Advantageous Effects

According to one embodiment of the present invention, a method of manufacturing titanium dioxide powder uses a stable and transparent titanyl chloride aqueous solution made from titanium tetrachloride as a starting material for a precipitation reaction, and thus may provide primary titanium dioxide particles with fineness and excellent crystallinity and a titanium dioxide powder with excellent characteristics from the primary titanium dioxide particles and that does not need long-time maturation or additional heat-treatment, and thus may be economical due to simple and practicable processes.

In addition, the method may make it possible to reproducibly regulate particle size by adjusting the amount of ethanol, the temperature for a precipitation reaction, and time and pressure for the precipitation.

Furthermore, a negative active material prepared by using titanium dioxide ($TiO_2$) particles according to one embodiment of the present invention may have excellent electrical conductivity and electrochemical properties such as charge and discharge characteristic and the like, and thus may be industrially useful.

MODE FOR INVENTION

Figure 1:
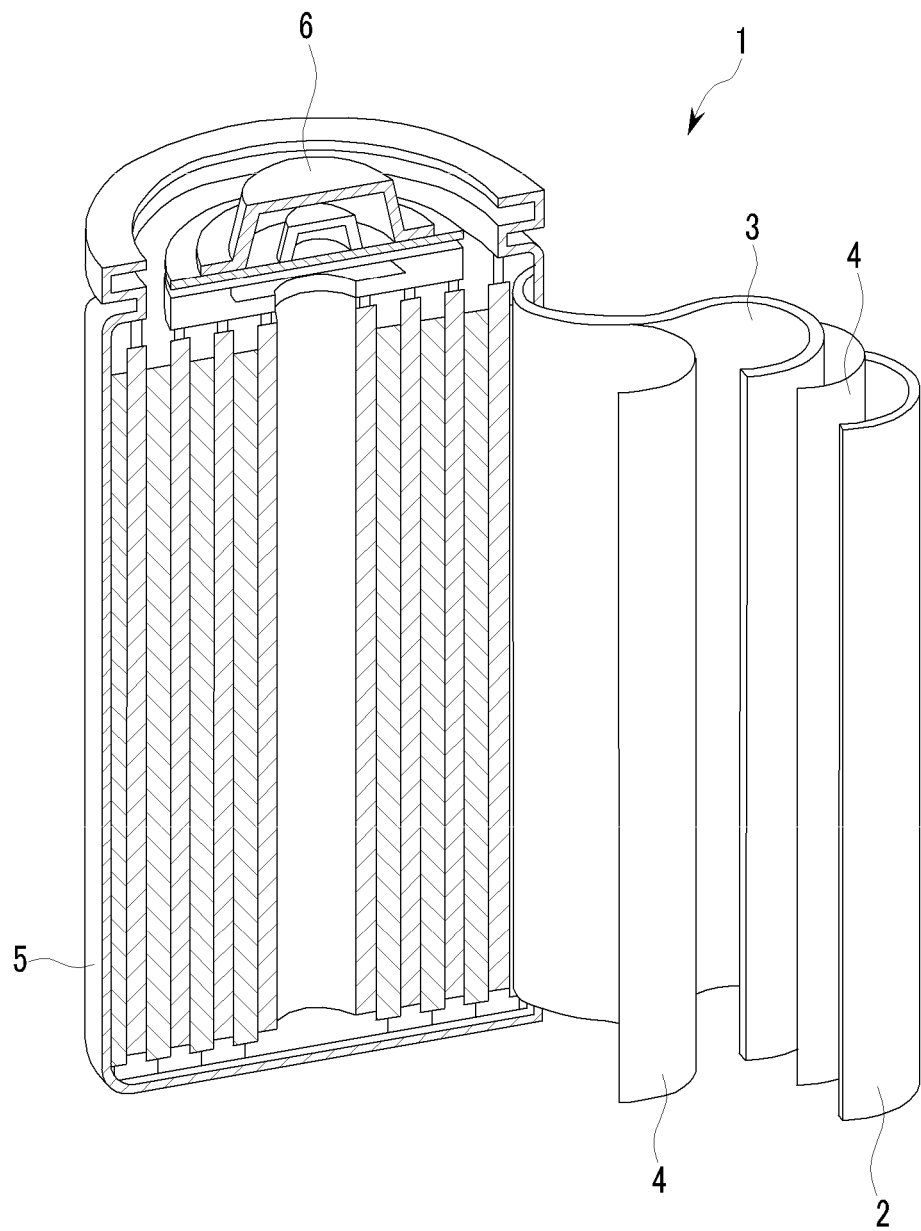
FIG. 1 provides a drawing schematically showing a rechargeable lithium battery according to one embodiment of the present invention.

Exemplary embodiments of the present invention will hereinafter be described in detail. However, these embodiments are only exemplary, and the present invention is not limited thereto.

One aspect of the present invention provides a method of manufacturing crystalline titanium dioxide powder which includes: preparing a titanyl chloride ($TiOCl_2$) aqueous solution by adding titanium tetrachloride ($TiCl_4$) to water at a temperature ranging from 0° C. to 10° C.; adding alcohol, urea, and a sphere-shaping agent to the titanyl chloride aqueous solution; and hydrothermally synthesizing the mixture under a pressure of 1.5 atm to 5 atm at a temperature ranging from 80° C. to 155° C. Hereinafter, the manufacturing method will be illustrated in more detail.

First of all, a titanyl chloride ($TiOCl_2$) aqueous solution is prepared by adding titanium tetrachloride ($TiCl_4$) to water at a temperature ranging from 0° C. to 10° C. When the water is out of the range of 0° C. to 10° C., tetrachloride may cause a hydrolysis reaction with water due to heat generated when the tetrachloride is dissolved in the water, forming titanium dioxide with inappropriate properties. The process is performed in a thermostat to maintain the temperature in a range of 0° C. to 10° C., and herein, the thermostat is maintained with ice or ice water.

The titanium tetrachloride may be liquid or solid, but a commercially available liquid titanium tetrachloride is used in general.

However, when the liquid titanium tetrachloride is not added in water but is reacted with alcohol, urea, and a sphere shaping agent, the titanium tetrachloride has high vapor pressure at room temperature and reacts with moisture in the air, and thus generates severe hydrochloric acid gas, which is unstable and hard to measure in quantity. In other words, titanium tetrachloride should be used as a stable aqueous solution by dissolving in water as aforementioned in order to be used for reaction.

The titanyl chloride aqueous solution is a transparent aqueous solution. In addition, the titanyl chloride aqueous solution may have a titanium ion concentration ranging from 0.4M to 0.8M. When the titanium ion concentration is in the range, titanium dioxide with a particular size and shape may be prepared in an excellent yield.

The water may be used in an amount ranging from 50 ml to 200 ml. Accordingly, the amount of titanium tetrachloride may be appropriately regulated considering a concentration within the range.

In this way, when titanium tetrachloride is added to water, titanyl chloride represented by the following Reaction Scheme 1 is formed, resultantly obtaining a titanyl chloride aqueous solution. The titanyl chloride is more stable against water than titanium tetrachloride, and thus exists as a stable storage solution at room temperature after the reaction.

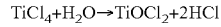

$TiCl_4 + H_2O \rightarrow TiOCl_2 + 2HCl$ [Reaction Scheme 1]

Next, alcohol, urea, and a sphere-shaping agent are added to the titanyl chloride aqueous solution to prepare a mixture.

After the titanyl chloride aqueous solution is mixed with alcohol, urea, and a sphere-shaping agent, the mixture may be agitated for 2 to 5 hours.

The alcohol may be included in an amount ranging from 50 ml to 200 ml. When alcohol is added within the range, titanium dioxide may have sphere shape and excellent dispersion. In addition, alcohol has a lower dielectric constant than water and thus lowers the dielectric constant of the entire aqueous solution, preparing appropriate titanium dioxide, and also has lower vapor pressure than water and thus may adjust internal pressure during hydrothermal synthesis.

Since alcohol is used in the same amount as water, the mixture may have a titanium ion concentration in a range of 0.2M to 0.4M.

In addition, the urea may be added to have a concentration ranging from 1M to 5M. In other words, the mixture may include urea in a concentration ranging from 1M to 5M. When the urea is included within the range, it may contribute to preparation of titanium dioxide with appropriate density.

The sphere-shaping agent may be added to have a concentration ranging from 0.01M to 0.1M in the mixture. In other words, the mixture may include a sphere-shaping agent in a concentration ranging from 0.01M to 0.1M. When the sphere-shaping agent is included within the range, titanium dioxide may have an appropriate spherical shape.

The alcohol may be a solvent, and the exemplary thereof may include anhydrous ethanol, propylalcohol, butanol, or a combination thereof.

The urea ($(NH_2)_2CO$) is a hydrolysis agent, and thus may be decomposed into carbon dioxide, ammonia ions, and hydroxide ions as shown in the following Reaction Scheme 2 when dissolved in water at 80° C. or higher.

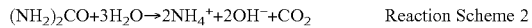

$(NH_2)_2CO + 3H_2O \rightarrow 2NH_4^+ + 2OH^- + CO_2$    Reaction Scheme 2

In other words, urea is decomposed at a particular temperature and thus may appropriately adjust a reaction. When ammonium hydroxide is used, it may similarly react with titanium ions but the reaction may occur at all temperatures, and in other words, as soon as the reaction occurs at the moment when added to a titanyl chloride aqueous solution, particles may be prepared to have non-uniform shape, size, and the like.

The sphere-shaping agent may play a role of shaping a final product into a sphere. According to one embodiment of the present invention, the sphere-shaping agent adjusts surface energy between solid and liquid of a primary particle prepared during a following hydrothermal synthesis, and plays a role of shaping a secondary particle prepared through agglomeration of the primary particles into a sphere and well-developing mesopores. In addition, when the sphere-shaping agent is used together with urea, it may promote formation of a spherical shape and development of mesopores. Examples of the sphere-shaping agent may include $(NH_4)_2SO_4$, $NH_4NO_3$, $(NH_4)_2CO_3$, or a combination thereof.

Then, the mixture is hydrothermally synthesized. The hydrothermal synthesis may be performed under a pressure ranging from 1.5 atm to 5 atm, and in another embodiment, from 2 atm to 3 atm. When the hydrothermal synthesis is performed within the pressure range, desired titanium dioxide may be prepared.

In addition, the hydrothermal synthesis may be performed at a temperature ranging from 80° C. to 155° C., and in another embodiment, from 90° C. to 100° C.

When the hydrothermal synthesis is performed at lower than 80° C., urea may not be decomposed and not reacted with titanium ions. In addition, when the hydrothermal synthesis reaction is performed at higher than 155° C., water included in the mixture may have an excessively high vapor pressure (e.g., 5 bar or higher) and bring about a risk of explosion, so that the hydrothermal synthesis may be performed at a maximum temperature of 155° C., considering safety. In other words, urea reacts with titanium ions at 80° C. or higher and may have hydrolysis and condensation, finally forming a titanium dioxide.

The hydrothermal synthesis may be performed for 4 to 7 hours. When the hydrothermal synthesis is performed within the range, the prepared particles may have appropriate crystallinity and a spherical shape.

The hydrothermal synthesis indicates a method of crystallizing non-crystalline powder at a high temperature under high pressure (Byrappa, K., Handbook of Crystal Growth, Vol. 2, 1994, edited by Hurl, D. T. J.).

The hydrothermal synthesis reaction may not include agitation since the precipitated crystalline particles may form a very irregular shape during the agitation.

In this way, the hydrothermal synthesis may be adjusted regarding reaction temperature and time to regulate properties (e.g., crystallinity, dispersion, and the like) of titanium dioxide powder.

The hydrothermal synthesis produces a crystalline titanium dioxide precipitate, and this titanium dioxide has an anatase phase. The titanium dioxide with an anatase phase has better electrical conductivity and a larger specific surface area than titanium dioxide with a rutile phase.

Next, titanium dioxide powder is obtained from a titanium dioxide precipitate, that is, a liquid in which titanium dioxide powder is formed, and is then washed and dried in a common post-process. The washing process may be performed by using anhydrous ethanol and water.

In addition, the washed precipitate may be finally washed with anhydrous ethanol before the drying to prevent agglomeration of the precipitate.

The drying may be performed at a temperature ranging from 60° C. to 100° C. for 12 hours or more. However, the drying may be better when performed at a temperature ranging from 90 to 110° C. for 24 hours or more, and in particular, for 24 hours at least and 36 hours at most, however there is necessarily no limit on maximum time for the drying.

The titanium dioxide powder may be heat-treated at a higher temperature, for example, 300° C. to 600° C., for 10 hours to 30 hours to reinforce crystallinity of the titanium dioxide powder. When the heat treatment process (a calcination process) is further performed, the titanium dioxide powder may be ground to regulate the particle size.

One embodiment of the present invention may provide a method of manufacturing titanium dioxide powder ($TiO_2$) with a spherical shape and excellent particle size and size distribution, and may also reproduce the crystalline titanium dioxide powder, which is simple, and can regulate the particle size.

In addition, the titanium dioxide ($TiO_2$) powder may include secondary particles formed through assembly of primary particles, and herein, the primary particles may have an average particle size ranging from about 10 nm to 20 nm, and the secondary particles may have an average particle size ranging from about 200 nm to about 2 μm. Furthermore, the titanium dioxide ($TiO_2$) powder may have an anatase phase, and this titanium dioxide ($TiO_2$) powder with an anatase phase may have better electrical conductivity and larger specific surface area than titanium dioxide $TiO_2$ powder with a rutile phase. The titanium dioxide powder including secondary particles assembled by primary particles has a large surface area of nanoparticles, and may simultaneously bring about a convenient process of using microparticles when mixed with a lithium-containing material.

In addition, crystalline titanium dioxide powder prepared according to the aforementioned method itself may be usefully used as a negative active material for a rechargeable lithium battery or usefully used to prepare a negative active material represented by the following Chemical Formula 1.

According to another embodiment of the present invention, a negative active material represented by the following Chemical Formula 1 and prepared by using crystalline titanium dioxide powder in the aforementioned method is provided.

$$Li_xTi_yO_z$$ [Chemical Formula 1]

In Chemical Formula 1, $3.8 \leq x \leq 4.2$, $4.8 \leq y \leq 5.2$, and $11.8 \leq z \leq 12.2$.

Still another embodiment of the present invention provides a method of manufacturing the negative active material and includes a step of mixing crystalline titanium dioxide with a carbon precursor liquid and a lithium-containing material, and another step of heat-treating the mixture. Hereinafter, each step is separately illustrated in detail.

First of all, crystalline titanium dioxide is mixed with a carbon precursor liquid and a lithium-containing material.

The crystalline titanium dioxide prepared according to one embodiment of the present invention may be used. As aforementioned, the crystalline titanium dioxide has an anatase phase, and thus has higher electrical conductivity and a larger specific surface area than crystalline titanium dioxide with a rutile phase.

The carbon precursor liquid may be used to include an amount of 2 to 20 parts by weight of a carbon precursor based on 100 parts by weight of the titanium dioxide. When the carbon precursor is included within the range, carbon may be uniformly coated sufficiently thick to not hamper diffusion of lithium around titanium dioxide.

Examples of the carbon precursor may have no particular limit, but in general, include pitch, hard carbon, soft carbon, natural graphite, artificial graphite, activated carbon, a conductive polymer, or a combination thereof, which are used as a negative active material. The conductive polymer is a polymer with conductivity, and for example, includes polyaniline (PAn), polyacetylene, polypyrrole, polythiophene, or a combination thereof.

The carbon precursor liquid may include any solvent with no particular limit, and an organic solvent, for example, N-methylpyrrolidone, carbon tetrachloride, tetrahydrofuran, or a combination thereof, may be used.

The lithium-containing material may include lithium carbonate, lithium hydroxide, lithium nitrate, lithium halide, lithium sulfate, or a combination thereof. Examples of the lithium-containing material may include LiOH, LiF, $LiSO_4$, $LiNO_3$, LiCl, or combination thereof.

The titanium dioxide and the lithium-containing material are mixed to have a mole ratio between titanium ions and lithium ions in a range of 4.8:3.8 to 5.2:4.2.

Next, the mixture is heat-treated. The mixture is further dried before the heat treatment. When the drying is further included, it may be performed in a vacuum oven at a temperature ranging from 80° C. to 120° C. for 8 to 24 hours. In addition, a pre-drying process of agitating the mixture on a hot plate at a temperature ranging from 130° C. to 170° C. may be further performed before the drying.

Furthermore, the heat treatment may be performed under an inert gas atmosphere. The inert gas may include argon gas, or a gas mixture of hydrogen and argon mixed in a volume ratio ranging from 4:96 to 5:95.

The heat treatment may be performed for 10 to 30 hours. The heat treatment temperature may be in a range of 800° C. to 1200° C., and in another embodiment, in a range of 850 to 950° C.

When the heat treatment is performed within the time and temperature range, a lithium titanate oxide with a pure spinel structure and a uniform carbon layer may be prepared.

In addition, the heat treatment may be performed by increasing a temperature at an increasing rate from 1° C./min to 4° C./min up to a temperature ranging from 800° C. to 1200° C. When the heat treatment is performed within the increasing rate range, titanium dioxide may have a smooth reaction with a lithium-containing material, preparing a desired lithium titanate oxide represented by Chemical Formula 1.

According to another embodiment of the present invention, a method of manufacturing a negative active material represented by the following Chemical Formula 1 for a rechargeable lithium battery may be provided, and includes a step of preparing a titanium dioxide-carbon liquid by mixing crystalline titanium dioxide according to one embodiment of the present invention, with a carbon precursor liquid, drying the titanium dioxide-carbon liquid to prepare titanium dioxide with a carbon layer, mixing the titanium dioxide having a carbon layer with a lithium-containing material, and heat-treating the mixture.

$$Li_xTi_yO_z$$ [Chemical Formula 1]

In Chemical Formula 1, $3.8 \leq x \leq 4.2$, $4.8 \leq y \leq 5.2$, and $11.8 \leq z \leq 12.2$.

The carbon precursor liquid, the lithium-containing material, the heat treatment, and the like used in the process are the same as aforementioned, and will be omitted here. In addition, the process may provide a negative active material with the same structure as a negative active material prepared by simultaneously mixing crystalline titanium dioxide, a carbon precursor, and a lithium-containing material.

In other words, a negative active material prepared according to either of the aforementioned processes may have a spherical shape and an average particle size ranging from 1 µm to 2 µm, which belongs to a micrometer range. Since this active material with a micrometer size has higher filling density than an active material with a nano-size, and thus high energy density per volume and is also easily dispersed when fabricated into an electrode, the negative active material may be relatively used in an excessive amount, while a conductive material and a binder may be used in a small amount.

Furthermore, the negative active material may have a carbon layer on the surface. In this way, the final negative active material includes carbon with excellent conductivity and thus may have improved conductivity. Further, the carbon layer may secure high electrical contact among the active materials and thus remarkably decrease resistance compared with a common active material. In addition, since the carbon layer plays a role of a conductive material, a conductive material may be less included while a negative active material is relatively more included, improving capacity.

Herein, a carbon layer may have a nanometer thickness, and in particular, a thickness ranging from about 10 nm to about 100 nm. When a carbon layer has a thickness within the range, it may give resistance against diffusion of lithium ions but high electrical conductivity to lithium titanate. In addition, the carbon layer may be included in an amount ranging from 0.5 to 20 parts by weight based on 100 parts by weight of lithium titanate represented by the above Chemical Formula 1. When the carbon layer is included within the range, it may not work as resistance against diffusion of lithium ions but may apply high electrical conductivity to lithium titanate.

Accordingly, the negative active material rechargeable may be usefully used as an active material for a lithium battery. When lithium titanate (e.g., $Li_4Ti_5O_{12}$) generally used as a negative active material is mixed with a carbon precursor and the mixture is heat-treated, the negative active material may not maintain a spherical shape or an average particle size of micrometers. In addition, when this product is used for a rechargeable lithium battery, it is difficult to have high tap density and may bring about agglomeration of lithium titanate during the heat treatment after mixing with a carbon precursor and thus decrease electrochemical activity.

Another embodiment of the present invention provides a rechargeable lithium battery including a negative electrode including the negative active material, a positive electrode including a positive active material, and a non-aqueous electrolyte.

The negative electrode includes a negative active material layer including a binder and selectively a conductive material other than a negative active material according to one embodiment of the present invention, and a current collector supporting the negative active material layer.

In addition, a negative electrode according to one embodiment of the present invention may include a negative active material generally used in a rechargeable lithium battery other than a negative active material according to one embodiment of the present invention. The generally-used negative active material has no particular limit, but includes lithium metal, hard carbon, soft carbon, natural graphite, artificial graphite, activated carbon, or a combination thereof.

The binder may include a copolymer of vinylidene fluoride/hexafluoropropylene, polyvinylidene fluoride, polyacrylonitrile, polymethylmethacrylate, polytetrafluoroethylene, or a combination thereof.

The conductive material may include carbon black, graphite, or a metal powder.

The current collector may be a copper current collector.

The negative electrode may be fabricated by mixing a negative active material, a binder, and selectively a conductive material in a solvent to prepare a negative active material composition and coating this composition on a current collector. The solvent may include N-methylpyrrolidone, acetone, tetrahydrofuran, decane, or a combination thereof. Herein, the negative active material, the binder, selectively the conductive material, and the solvent may be included in a common amount used for a rechargeable lithium battery.

The positive electrode may include a positive active material layer including a positive active material, a conductive material, and a binder, and a current collector supporting the positive active material layer. The positive active material may include a compound that reversibly intercalates/deintercalates lithium, for example, $LiMn_2O_4$, $LiCoO_2$, $LiNiO_2$, $LiFePO_4$, $V_2O_5$, TiS, and the like, but is not limited thereto. The conductive material and the binder are the same as aforementioned, and the current collector may include Al but is not limited thereto.

The electrolyte may be liquid or solid.

The liquid electrolyte may include a non-aqueous solvent and a lithium salt.

The non-aqueous solvent may include an aprotic solvent such as propylene carbonate (hereinafter, PC), ethylene carbonate (hereinafter, EC), butylene carbonate, benzonitrile, acetonitrile, tetrahydrofuran, 2-methyl tetrahydrofuran, γ-butyrolactone, dioxolane, 4-methyl dioxolane, N,N-dimethyl formamide, dimethylacetoamide, di methylsulfoxide, dioxane, 1,2-dimethoxyethane, sulfolane, dichloroethane, chlorobenzene, nitrobenzene, dimethyl carbonate (hereinafter, DMC), ethylmethyl carbonate (hereinafter, EMC), diethyl carbonate, methylpropyl carbonate, methylisopropyl carbonate, ethylbutyl carbonate, dipropyl carbonate, diisopropylcarbonate, dibutyl carbonate, diethylene glycol, dimethylether, and the like, or a combination of two or more solvents thereof.

The lithium salt may include $LiCF_3SO_3$, $Li(CF_3SO_2)_2$, $LiPF_6$, $LiBF_4$, $LiClO_4$, $LiN(SO_2C_2F_5)_2$, or the like, singularly or in a mixture of two or more.

The solid electrolyte may include a polymer with high ion conductivity against lithium ions, and in particular, polyethylene oxide, polypropylene oxide, polyethyleneimine, and the like. In addition, the electrolyte may be prepared as a gel by adding the non-aqueous solvent and a lithium salt to the polymer.

In addition, a separator may be additionally included depending on kinds of a rechargeable lithium battery, and for example, it may include an olefin-based porous film such as polyethylene, polypropylene, and the like.

FIG. 1 shows a rechargeable lithium battery 1 according to one embodiment of the present invention. The rechargeable lithium battery 1 shown in FIG. 1 includes a negative electrode 2, a positive electrode 3, a separator 4 disposed between the negative electrode 2 and the positive electrode 3, an electrolyte impregnated in the negative electrode 2, the positive electrode 3, and the separator 4, a battery container 5, and a sealing member 6 sealing the container 5. The rechargeable lithium battery shown in FIG. 1 is cylindrical but may have various shapes such as a prism, a coin, a sheet, or the like.

Hereinafter, embodiments of the present invention are illustrated in detail. However, the following embodiments are exemplary in the present invention but do not limit the content of the present invention.

EXAMPLE 1

Preparation of Titanium Dioxide Powder

Titanium tetrachloride with a concentration of 99.9% was slowly added to 100 ml of distilled water cooled to about 0° C. by using ice in a thermostat, preparing a stable titanyl chloride aqueous solution. The amount of titanyl chloride used was sufficient to have a titanium ion concentration of 0.6M in the titanyl chloride aqueous solution.

Then, 100 ml of anhydrous ethanol, urea, and $(NH_4)_2SO_4$ were added to the titanyl chloride aqueous solution, preparing a mixture. Herein, the amount of the urea was used to have a concentration of 5M, and $(NH_4)_2SO_4$ was used to have a concentration of 0.05M in the mixture. In the final mixture, titanium ions had a concentration of 0.3M.

The mixture was slowly agitated for 2 hours, and transferred into a hydrothermal reactor, followed by hydrothermally synthesizing (precipitating) at 95° C. with a pressure of 2.5 atm for 5 hours.

Subsequently, the titanium dioxide precipitate was obtained and it was separated and washed with distilled water until it became neutral, and then finally washed with ethanol. The obtained crystalline precipitate was dried at 60° C. for 24 hours in a drier, preparing titanium dioxide powder with 100% of an anatase phase.

Figure 2:
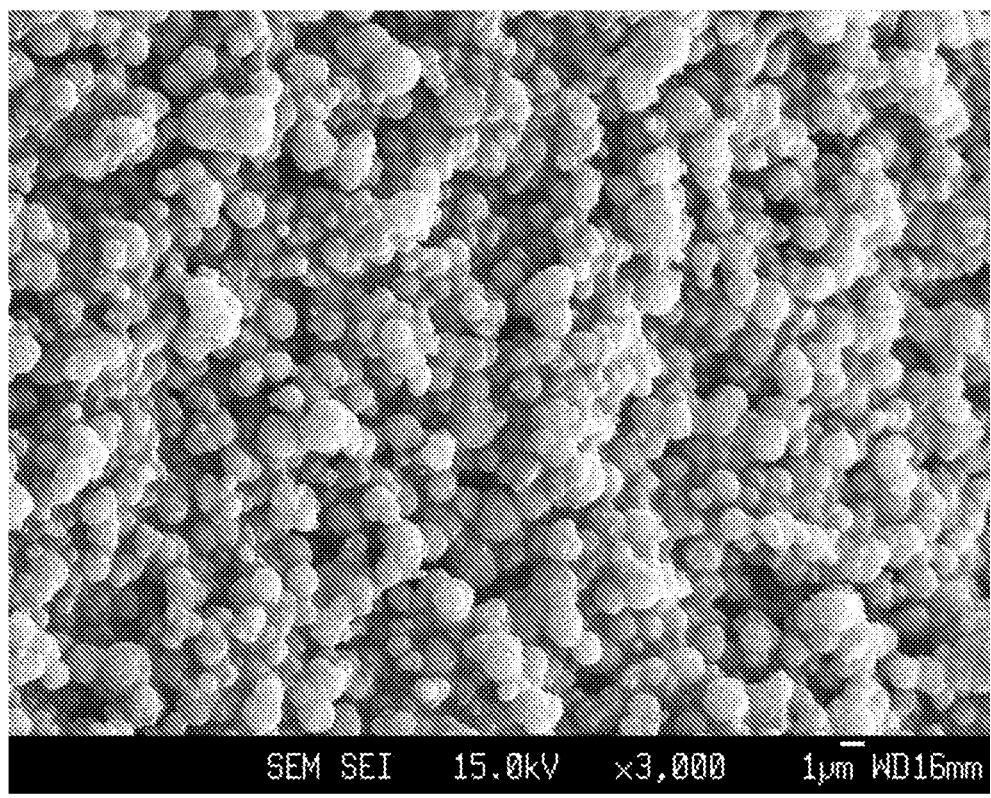
FIG. 2 provides a 3000 times-enlarged SEM photograph of titanium dioxide powder according to Example 1.
Figure 3:
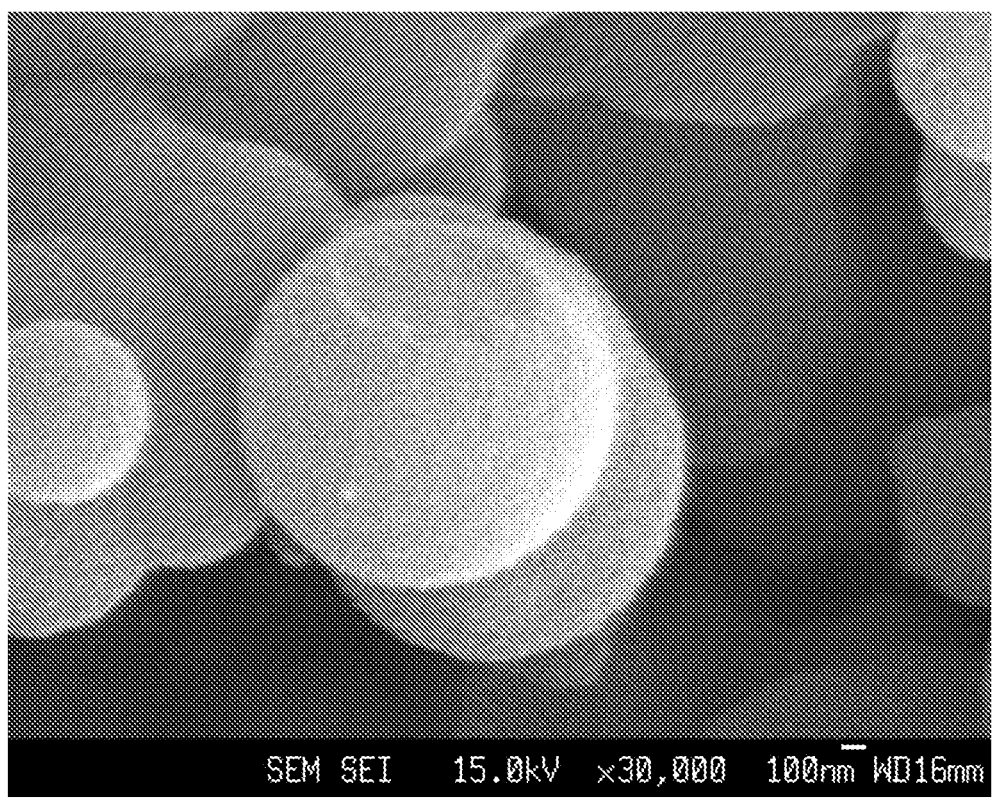
FIG. 3 is a 30,000 times-enlarged SEM photograph of titanium dioxide powder according to Example 1.

FIGS. 2 and 3 show 3000 times and 30,000 times enlarged SEM photographs of the titanium dioxide powders according to Example 1. The SEM analysis was performed by using JMS-6340F made by JEOL Ltd. As shown in FIG. 2 and FIG. 3, the titanium dioxide powder had a perfect spherical shape.

EXAMPLE 2

The dried titanium dioxide (TiO$_2$) powder prepared according to Example 1 was heat-treated at 400° C. for 5 hours.

EXAMPLE 3

The dried titanium dioxide (TiO$_2$) powder according to Example 1 was heat-treated at 500° C. for 5 hours.

EXAMPLE 4

The dried titanium dioxide (TiO$_2$) powder according to Example 1 was heat-treated at 600° C. for 5 hours.

REFERENCE EXAMPLE 1

The dried titanium dioxide (TiO$_2$) powder according to Example 1 was heat-treated at 700° C. for 5 hours.

Figure 4:
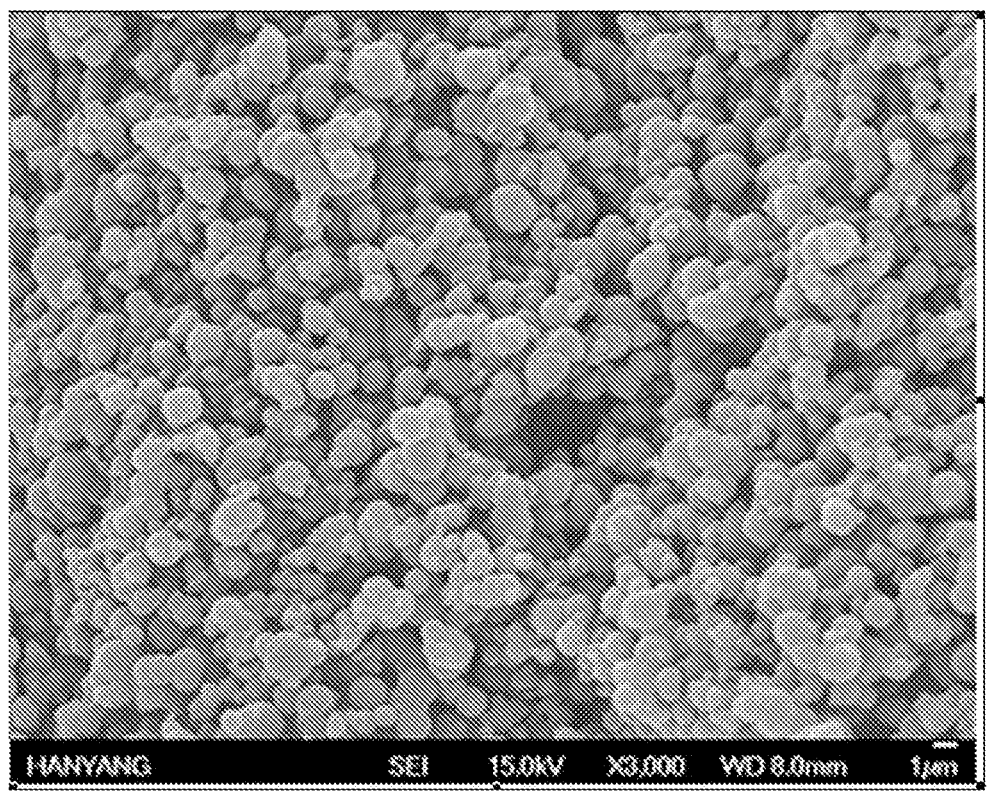
FIG. 4 is a 3000 times-enlarged SEM photograph of titanium dioxide powder according to Example 2.
Figure 5:
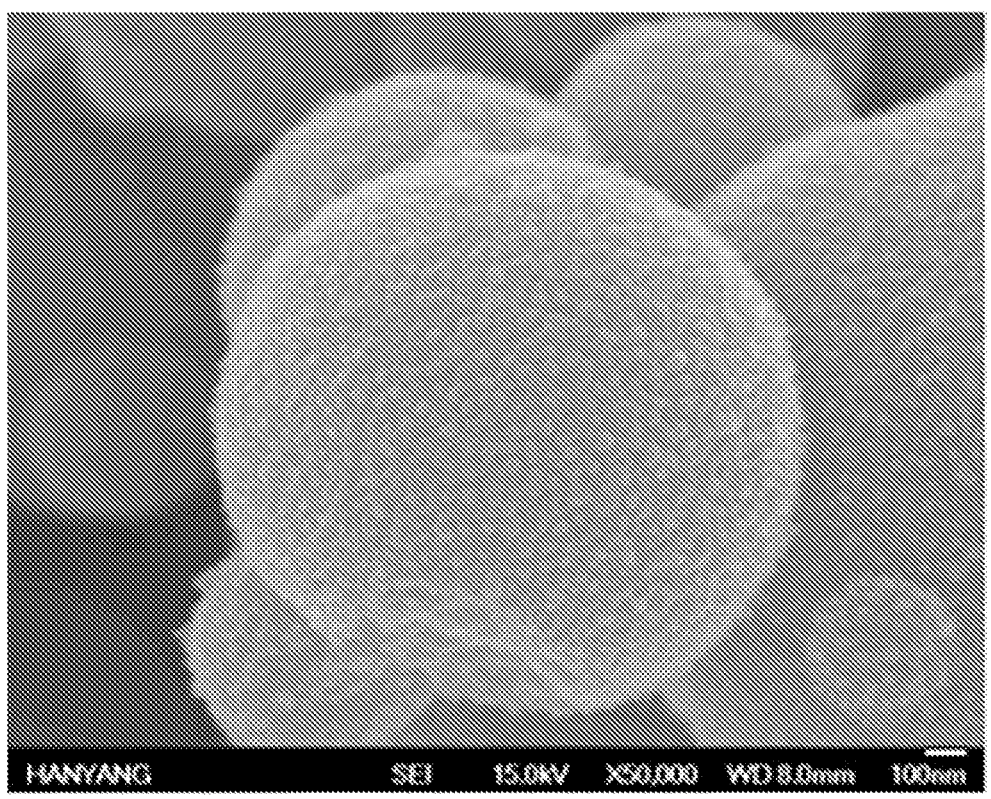
FIG. 5 is a 50,000 times-enlarged SEM photograph of titanium dioxide powder according to Example 2.

The SEM analysis of the titanium dioxide powder according to Example 2 was performed by using JMS-6340F made by JEOL Ltd., and the results are provided in FIGS. 4 and 5 (FIG. 4: 3000 times enlarged SEM analysis, FIG. 5: 50,000 times enlarged SEM analysis).

As shown in the SEM photograph of FIG. 4, the titanium dioxide heat-treated at 400° C. turned out to be a crystalline particle including a primary particle with a diameter of about 10 nm and a secondary particle with a diameter ranging from about 200 nm to about 2 μm. In addition, when titanium dioxide powder including the primary and secondary particles according to Example 2 is used to prepare an active material for a lithium ion secondary battery, lithium ions in the negative active material may have a shorter diffusion distance and a larger contact area among the active particles, since the particles have a perfect spherical shape.

Figure 6:
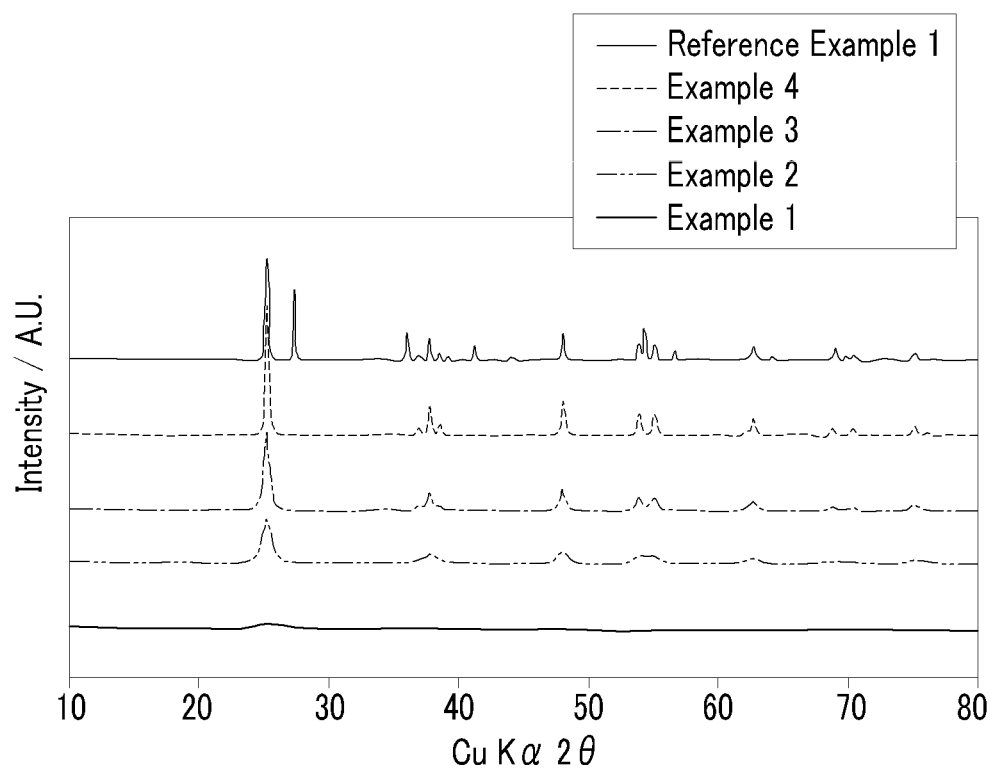
FIG. 6 is a graph showing XRD measurements of titanium dioxide powders according to Examples 1 to 5.

Furthermore, the titanium dioxide powders according to Examples 1 to 5 and Reference Example 1 were analyzed regarding X-ray diffraction for crystal structure analysis. The XRD pattern analysis was performed by using Rint-2000 and CuKα made by Rigaku Ltd. The results are provided in FIG. 6. As shown in FIG. 6, the titanium dioxide powders turned out to have more strength as a temperature increases during heat treatment compared with the titanium dioxide powder having no heat treatment according to Example 1, and in addition, the titanium dioxide powders according to Examples 1 to 5 all maintained an anatase phase. On the other hand, the titanium dioxide powder heat-treated at 700° C. according to Reference Example 1 had a rutile phase.

Figure 7:
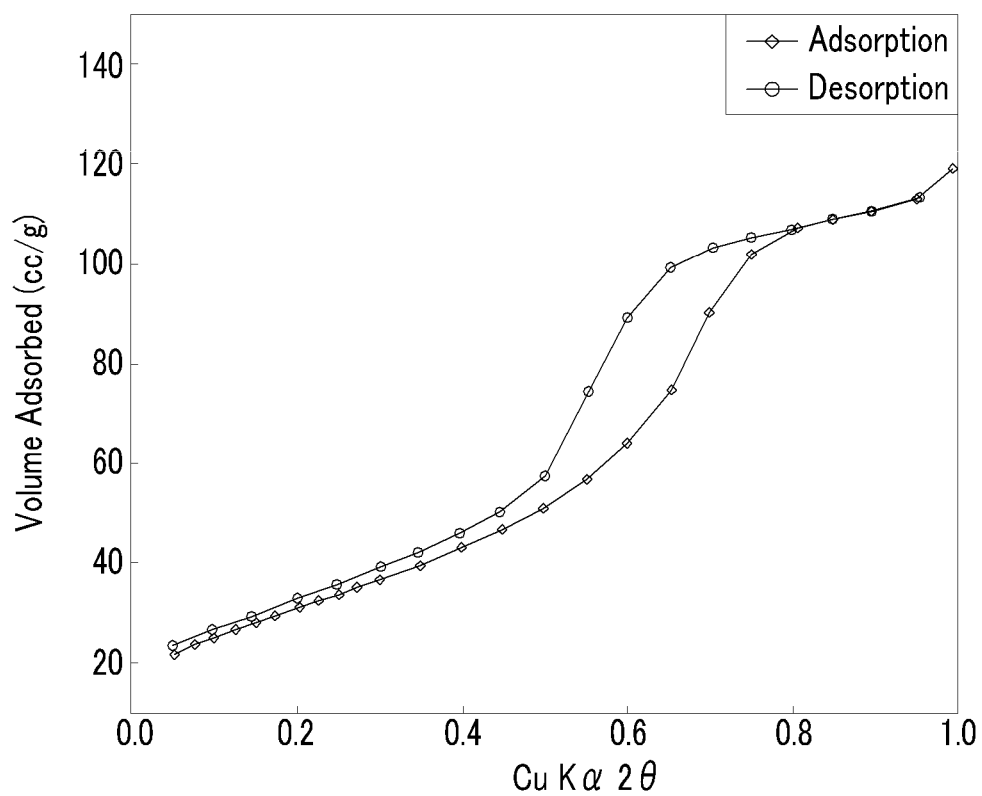
FIG. 7 is a graph showing specific surface area measured through nitrogen absorption/desorption analysis of titanium dioxide powder according to Example 2.
Figure 8:
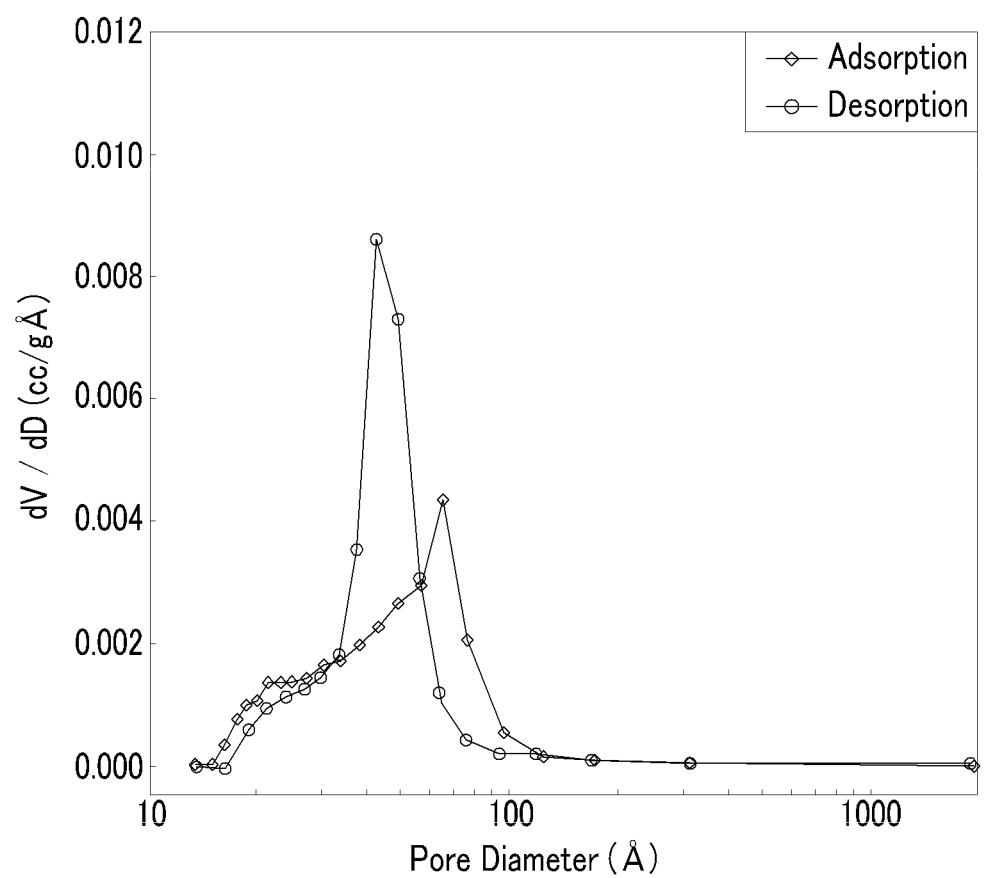
FIG. 8 provides a graph showing a pore analysis result through nitrogen absorption/desorption analysis of titanium dioxide powder according to Example 2.

In addition, the titanium dioxide powder according to Example 2 was analyzed regarding nitrogen absorption/desorption amounts, and its specific surface area and pore analysis results are respectively provided in FIGS. 7 and 8. As shown in FIGS. 7 and 8, the titanium dioxide powder according to Example 2 had a specific surface area of 116.49 m$^2$/g, an entire pore volume of 0.1842 cc/g, and a pore size ranging from about 4 to 7 nm.

EXAMPLE 5

Fabrication of Rechargeable Lithium Battery

The titanium dioxide according to Example 2 was used as a negative active material, fabricating a negative electrode. Herein, a conductive material was prepared by mixing KS-6 with super-P, carbon black in a ratio of 50 wt % and 50 wt %, and polyvinylidene fluoride was used for a binder. In addition, the negative active material, the conductive material, and the binder were mixed in a ratio of 80:10:10 wt %. The negative electrode was fabricated by mixing the negative active material, the conductive material, and the binder in an N-methylpyrrolidone solvent to prepare a negative active material slurry, coating the negative active material slurry on a Cu foil, and then drying and compressing the coated foil.

The negative electrode was used with a lithium foil as a counter electrode, fabricating a coin-type half-cell. Herein, an electrolyte solution was prepared by dissolving 1M LiPF$_6$ made by Jeil Industries Inc. in a mixed solvent of ethylene carbonate and diethyl carbonate in a ratio of 1:1 vol %.

Figure 9:
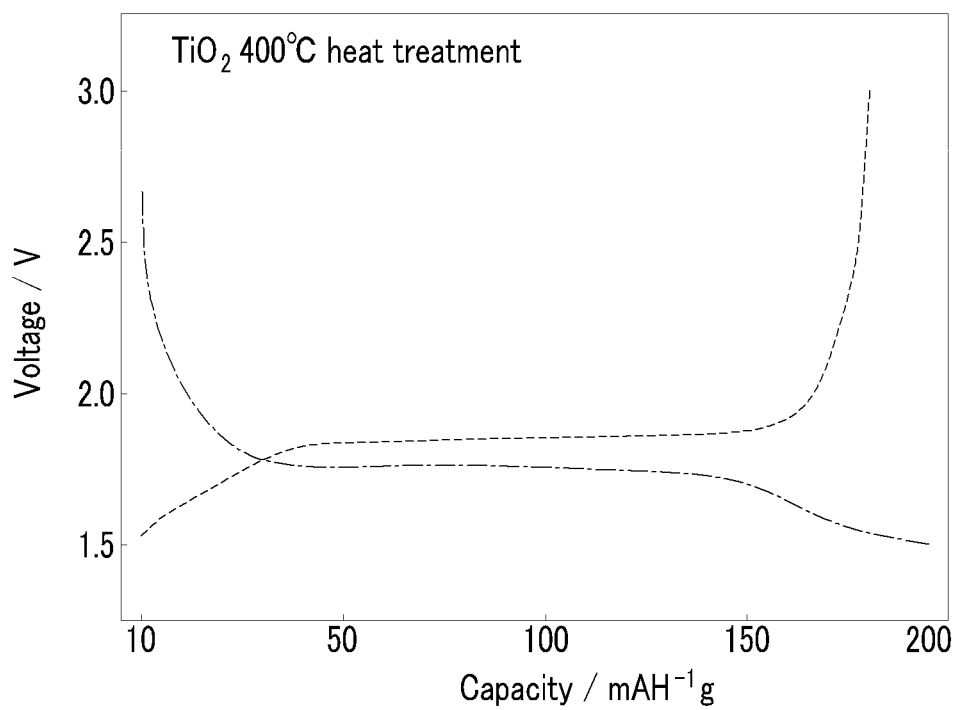
FIG. 9 is a graph showing charge and discharge characteristics of a half-cell according to Example 5.

The half-cell was evaluated regarding charge and discharge by using Toscat-3000 series made by Toyo System Co., Ltd. The charge and discharge experiment was performed by charging and discharging the half-cell at 0.1 C in a potential region ranging from 1.5V to 3.0V, and the results are provided in FIG. 9. As shown in FIG. 9, the half-cell had a discharge capacity of 180.2 mAh/g.

Figure 10:
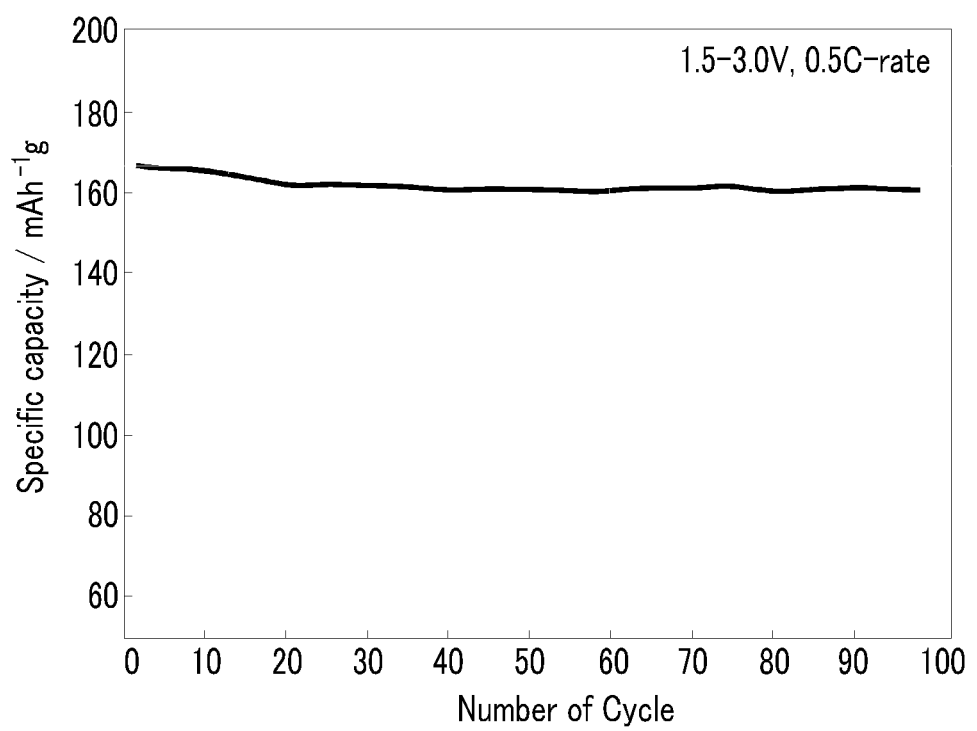
FIG. 10 is a graph showing the cycle life characteristic of a half-cell according to Example 5.

The half-cell was charged at 0.5 C in a range of 1.5V to 3.0V for 2 hours, paused for 10 minutes, and discharged at 0.5 C for 2 hours a total of 96 times, and measured regarding the cycle-life characteristic. The result is provided in FIG. 10. As shown in FIG. 10, the half-cell had an excellent cycle life characteristic without capacity deterioration after 96 charges and discharges.

EXAMPLE 6

100 ml of anhydrous ethanol and urea and (NH$_4$)$_2$SO$_4$ were added to the titanyl chloride aqueous solution according to Example 1, preparing a mixture. Herein, titanium dioxide powder with 100% of an anatase phase was prepared according to the same method as Example 1, except for using the urea and the (NH$_4$)$_2$SO$_4$ to have a respective concentration of 1M and 0.05M in the mixture.

EXAMPLE 7

100 ml of anhydrous ethanol and urea and (NH$_4$)$_2$SO$_4$ were added to the titanyl chloride aqueous solution according to Example 1, preparing a mixture. Herein, titanium dioxide powder with 100% of an anatase phase was prepared according to the same method as Example 1 by including urea and (NH$_4$)$_2$SO$_4$ to have respective concentrations of 2.5M and 0.05M in the mixture.

COMPARATIVE EXAMPLE 1

100 ml of anhydrous ethanol and urea were added to the titanyl chloride aqueous solution according to Example 1, preparing a mixture. Herein, titanium dioxide powder with 100% of an anatase phase was prepared according to the same method as Example 1 by using urea to have a concentration of 5M.

Figure 11:
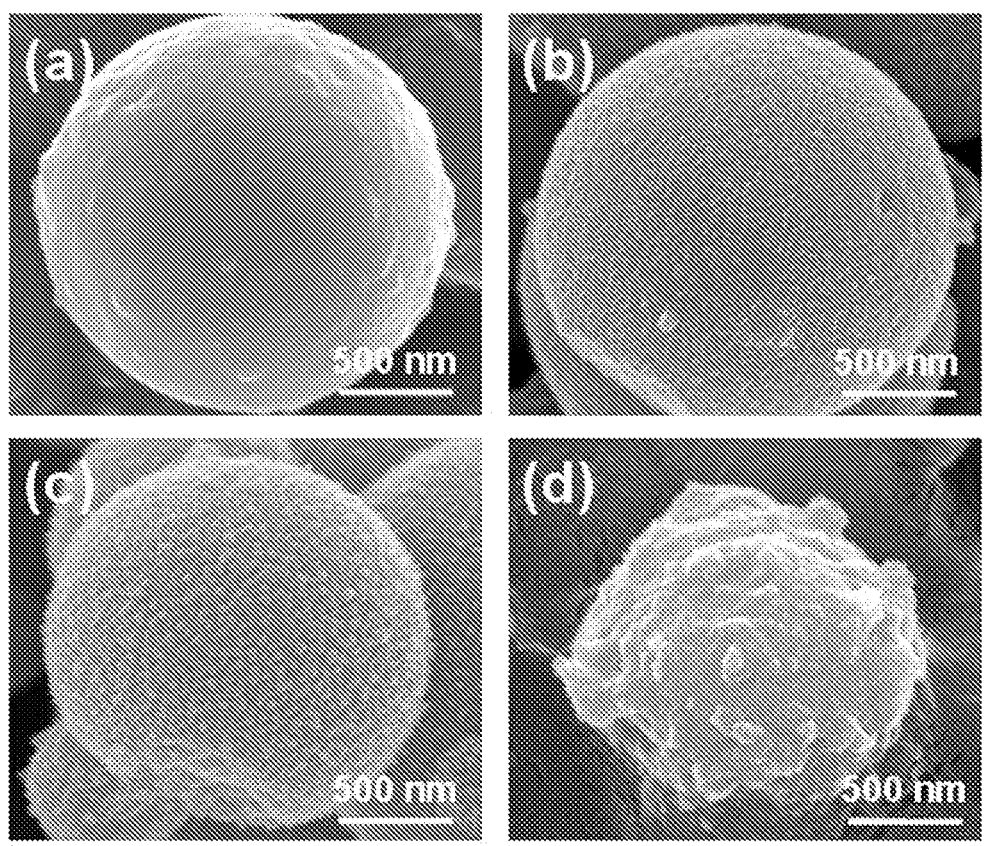
FIG. 11 is SEM photograph of titanium dioxide powders according to Examples 1, 6, and 7 and Comparative Example 1.

SEM photographs of the titanium dioxide powders according to Examples 6 and 7 and Comparative Example 1 are provided in FIGS. 11 (*a*), (*b*), and (*d*), while the SEM photograph of the titanium dioxide powder according to Example 1 is provided in FIG. 11 (*c*) for comparison. As shown in FIG. 11, the titanium dioxide powders including both urea and (NH$_4$)$_2$SO$_4$ during the titanium dioxide preparation according to Examples 1, 6, and 7 had a substantially spherical shape and a smooth surface, while the titanium dioxide powder including urea but no (NH$_4$)$_2$SO$_4$ according to Comparative Example 1 had no spherical shape and had a rough surface.

EXAMPLES 8 to 11

2 parts by weight, 5 parts by weight, 10 parts by weight, and 20 parts by weight of pitch were respectively added to N-methylpyrrolidone based on 100 parts by weight of the titanium dioxide ($TiO_2$) according to Example 1, preparing carbon precursor liquids.

Then, the titanium dioxide according to Example 1 and lithium carbonate were added to the carbon precursor liquid, and herein, the titanium dioxide and lithium carbonate were mixed in a mole ratio of 5:2. The mixture was agitated on a 130° C. hot plate and then dried in a 110° C. vacuum oven for 10 hours.

The dried product was heat-treated, preparing a $Li_4Ti_5O_{12}$ negative active material having a carbon layer on the surface. The heat treatment was performed by increasing the temperature at an increasing rate of 2° C./min up to 900° C. and maintaining the same temperature for 20 hours under an argon (Ar) atmosphere.

EXAMPLES 12 to 15

A negative electrode was fabricated by preparing a negative active material slurry by mixing each negative active material according to Examples 8 to 11, a conductive material prepared by mixing KS-6 with super-P, carbon blacking a ratio of 50 wt % and 50 wt %, and a polyvinylidene fluoride binder in an N-methylpyrrolidone solvent, coating the negative active material slurry on a Cu foil, and then drying and compressing the coated foil.

The negative electrode was used with a lithium foil as a counter electrode, fabricating a coin-type half-cell. Herein, an electrolyte solution was prepared by dissolving 1M $LiPF_6$ made by Jeil Industries Inc. in a mixed solvent of ethylene carbonate and diethyl carbonate in a ratio of 1:1 vol %.

COMPARATIVE EXAMPLE 2

The titanium dioxide ($TiO_2$) according to Example 1 was mixed with lithium carbonate in a mole ratio of 5:2, and the mixture was heat-treated, preparing a $Li_4Ti_5O_{12}$ negative active material. The heat treatment was performed by increasing a temperature at an increasing rate of 2° C./min and maintaining the same temperature for 20 hours under an argon (Ar) atmosphere.

COMPARATIVE EXAMPLE 3

A coin-type half-cell was fabricated according to the same method as Example 12, except for using the negative active material according to Comparative Example 2.

Figure 12:
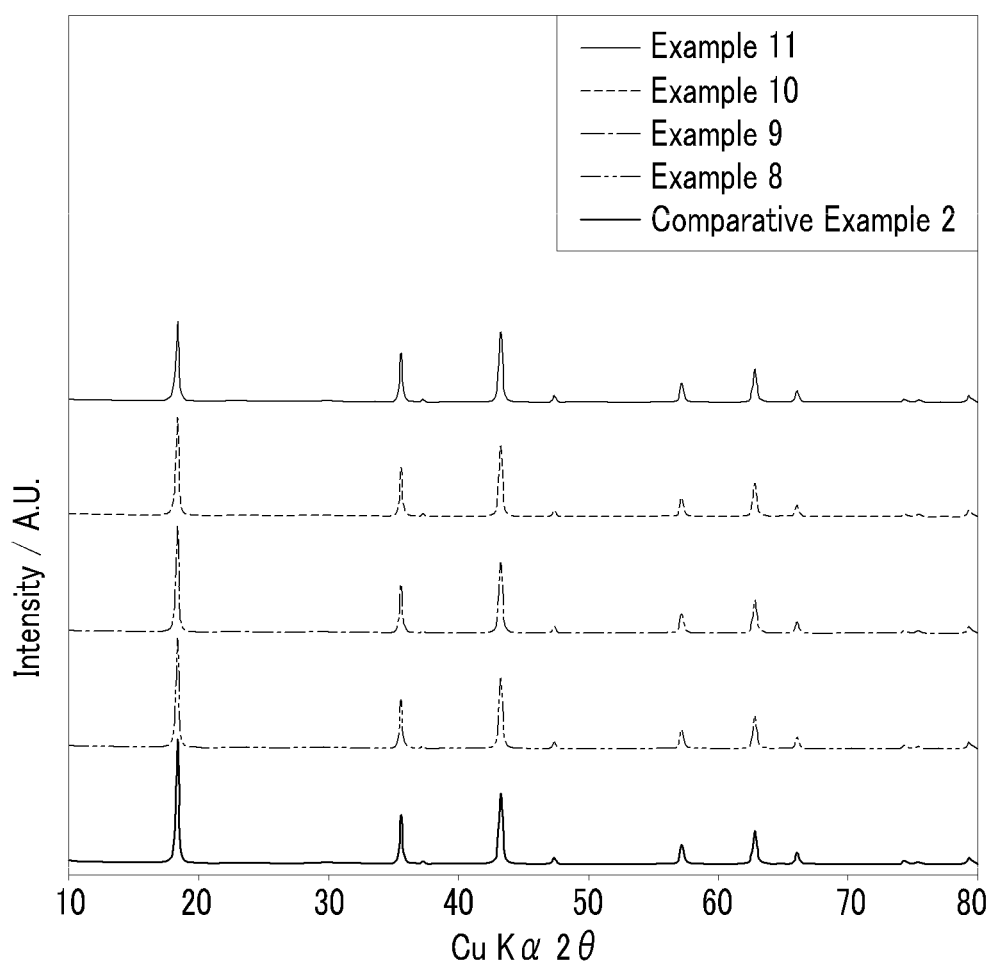
FIG. 12 is a graph showing XRD measurements of negative active materials according to Examples 8 to 11 and Comparative Example 2.

In addition, the negative active materials according to Examples 8 to 11 and Comparative Example 2 were analyzed regarding X-ray diffraction for crystal structure analysis. The XRD pattern analysis was performed by using Rint-2000 and CuKα ray by Rigaku Ltd. The result is provided in FIG. 12. As shown in FIG. 12, since the negative active materials according to Examples 8 to 11 and Comparative Example 2 had almost the same XRD pattern, the titanium dioxide powders having a carbon coating layer according to Examples 8 to 11 had no structural change when prepared into the negative active materials. In other words, the negative active materials according to Examples 8 to 11 had a crystalline structure with a spinel phase like the negative active material having no pitch coating according to Comparative Example 2.

The negative active materials according to Example 9 and Comparative Example 2 were respectively identified regarding morphology through a SEM. The SEM analysis was performed by using JMS-6340F made by JEOL Co., Ltd. As a result, FIG. 13 provides a 3000 times enlarged SEM photograph of the negative active material according to Comparative Example 2, and FIG. 14 provides a 30,000 times enlarged SEM photograph of the negative active material according to Comparative Example 2, while FIG. 15 provides a 3000 times enlarged SEM photograph of the negative active material according to Comparative Example 9, and FIG. 16 provides a 30,000 times enlarged SEM photograph of the negative active material according to Comparative Example 9.

Figure 13:
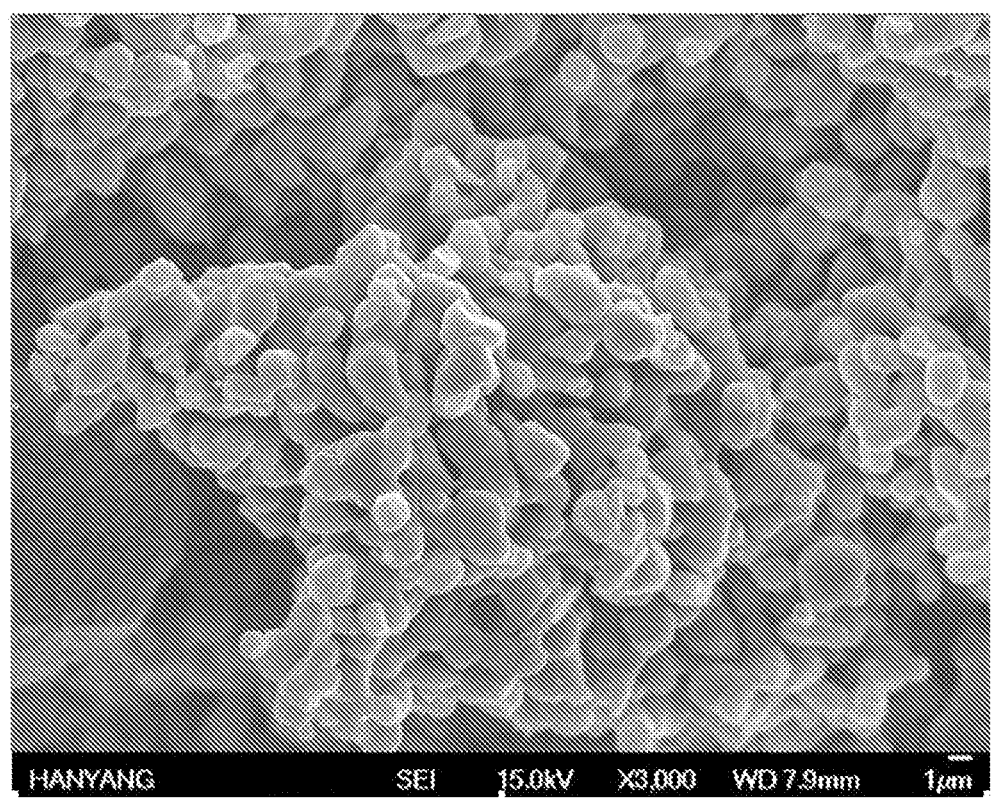
FIG. 13 is a 3000 times-enlarged SEM photograph of a negative active material according to Comparative Example 2.
Figure 14:
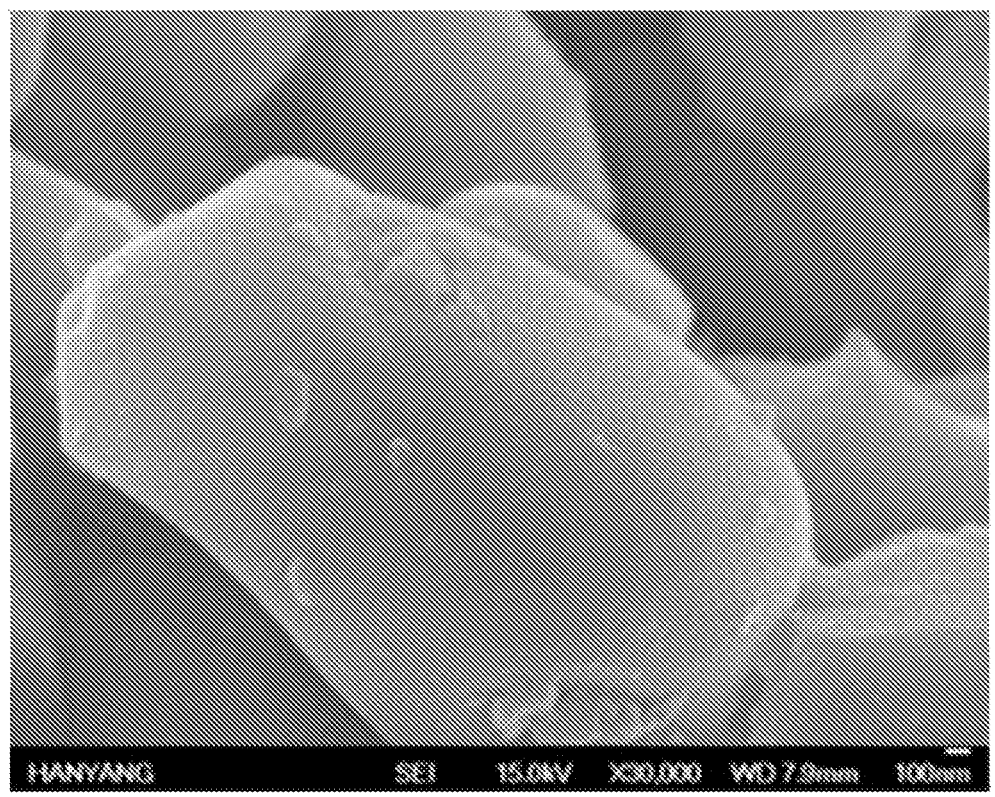
FIG. 14 is a 30,000 times-enlarged SEM photograph of a negative active material according to Comparative Example 2.

As shown in FIGS. 13 and 14, the negative active material coated with no pitch according to Comparative Example 2 had particle growth but did not maintain a spherical shape and had a bigger size.

Figure 15:
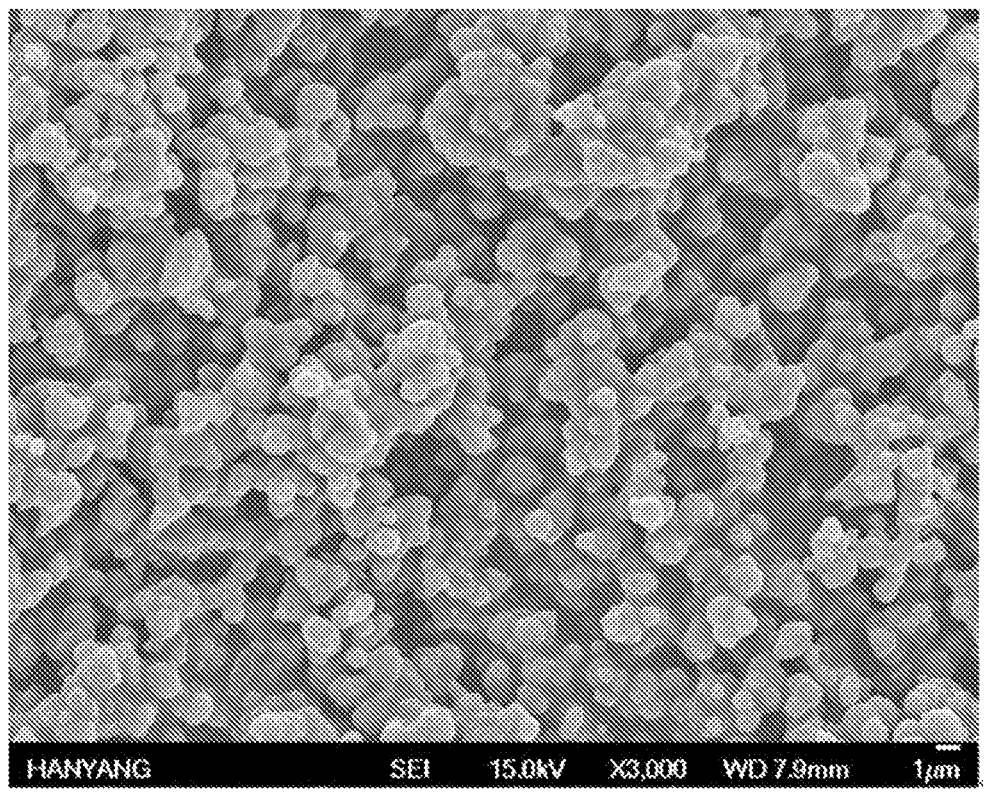
FIG. 15 is a 3000 times-enlarged SEM photograph of a negative active material according to Example 9.
Figure 16:
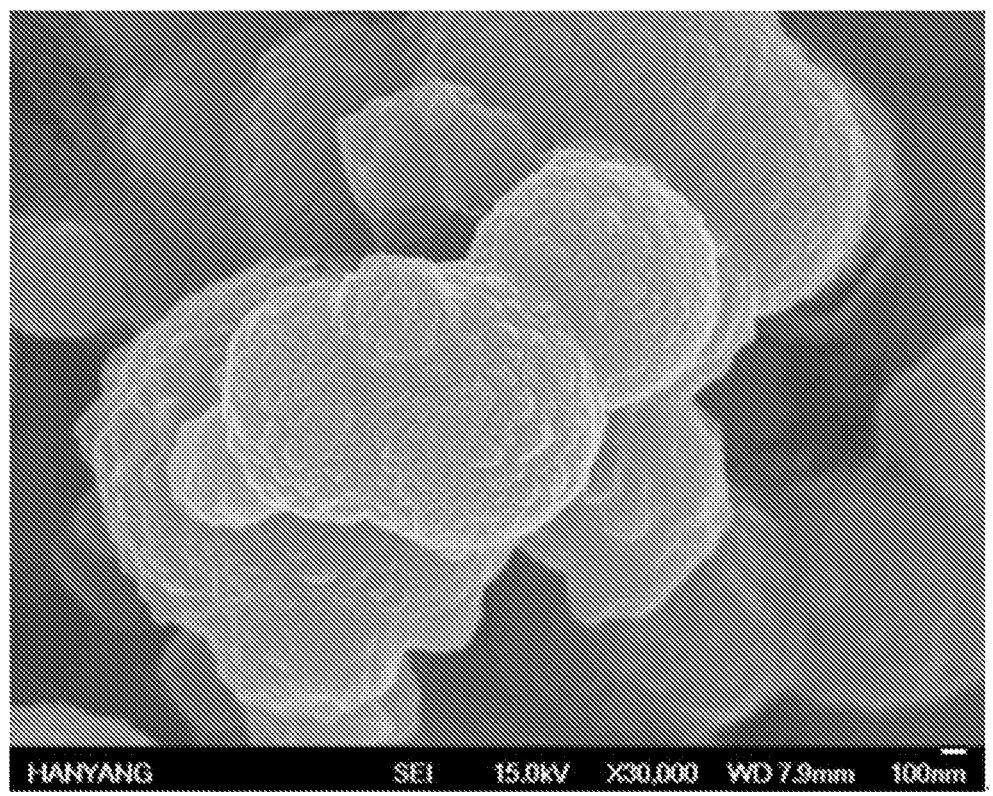
FIG. 16 is a 30,000 times-enlarged SEM photograph of a negative active material according to Example 9.

On the contrary, as shown in FIGS. 15 and 16, the negative active material prepared by using titanium dioxide ($TiO_2$) coated with 5 parts by weight of pitch according to Example 9 was suppressed from growth of particle size and maintained a spherical shape, and also was identified to be surrounded with a carbon material on the surface of $Li_4Ti_5O_{12}$.

Figure 17:
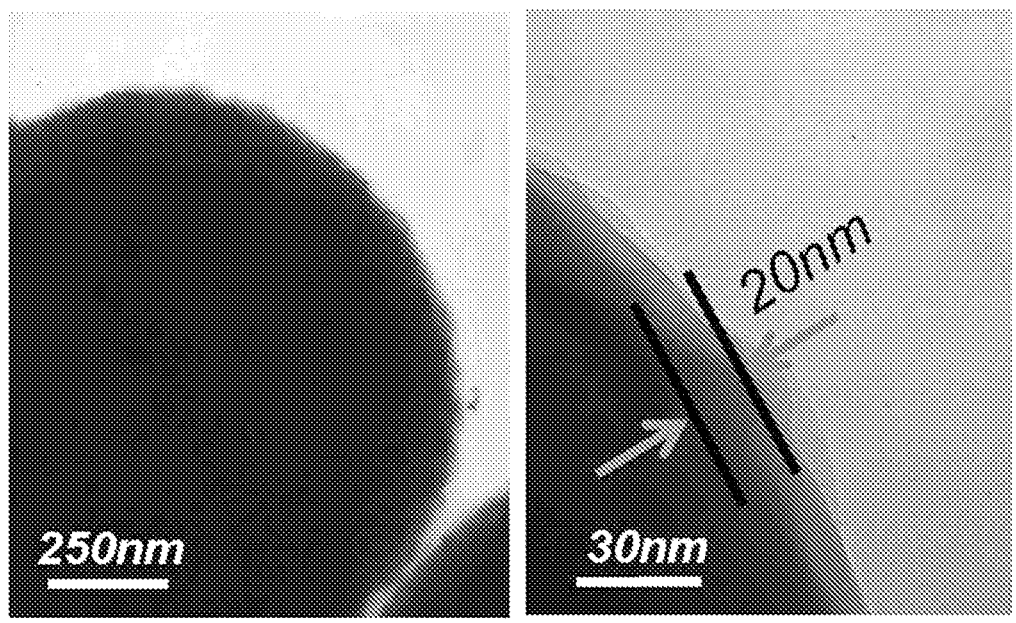
FIG. 17 is TEM photograph of a negative active material according to Example 9.
Figure 18:
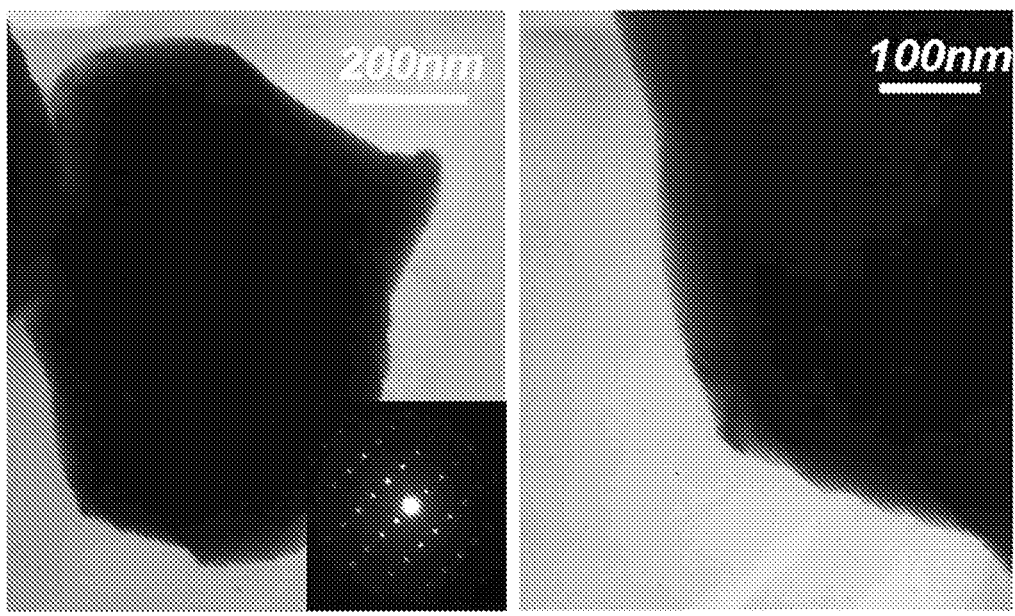
FIG. 18 is TEM photograph of a negative active material according to Comparative Example 2.

In addition, FIGS. 17 and 18 respectively provide TEM photographs of the negative active materials according to Example 9 and Comparative Example 2. As shown in FIG. 17, the negative active material according to Example 9 had an about 20 nm-thick carbon layer compared with the negative active material according to Comparative Example 2 as shown in FIG. 18.

Figure 19:
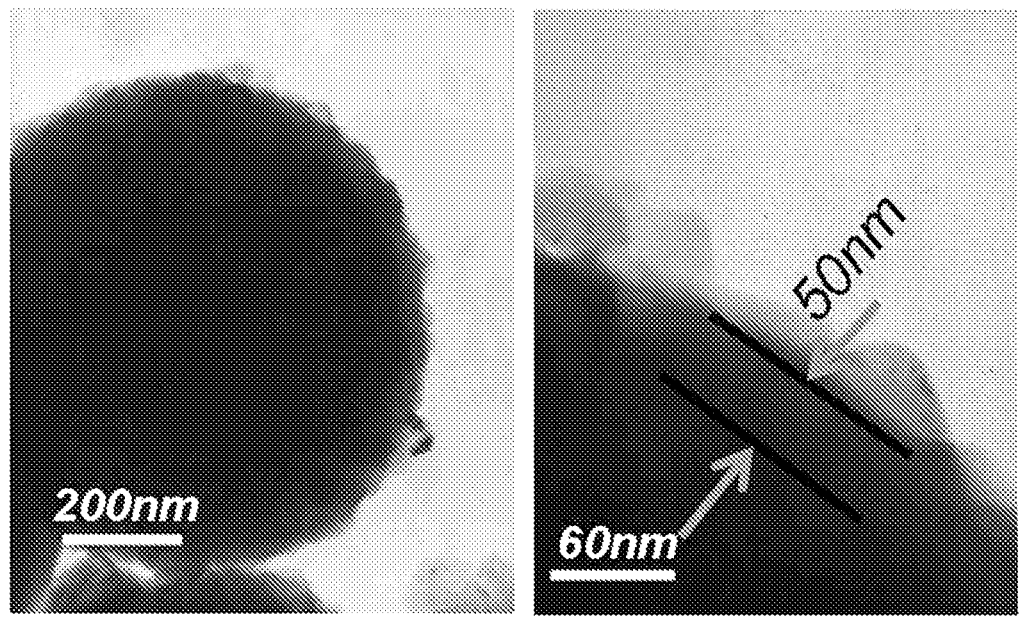
FIG. 19 is TEM photograph of a negative active material according to Example 10.
Figure 20:
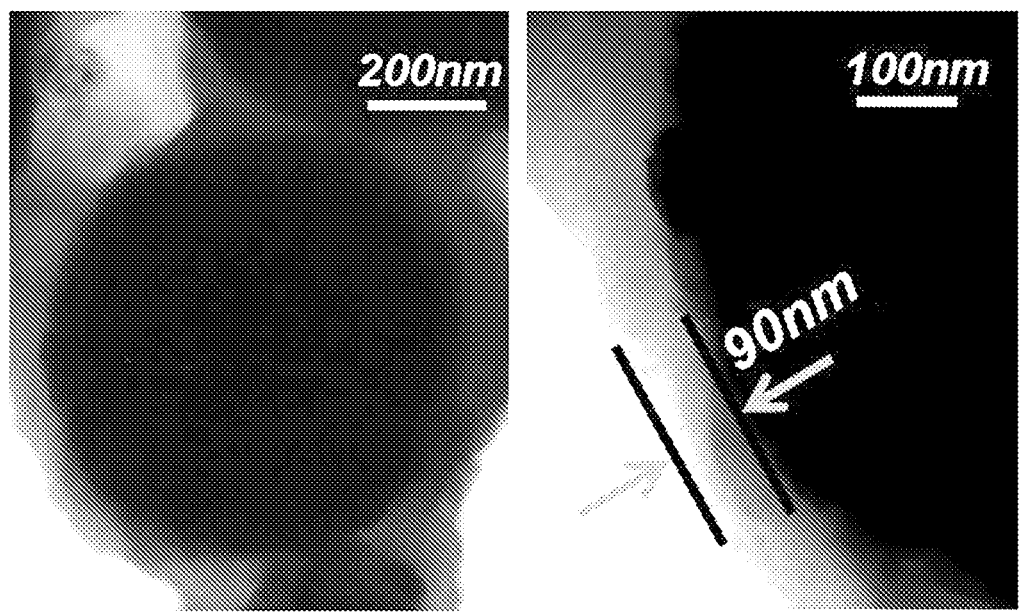
FIG. 20 is TEM photograph of a negative active material according to Example 11.

In addition, FIGS. 19 and 20 respectively provide TEM photographs of the negative active materials according to Examples 10 and 11.

As shown in FIG. 20, the negative active material according to Example 11 had an about 90 nm-thick carbon layer, and as shown in FIG. 19, the negative active material according to Example 10 had an about 50 nm-thick carbon layer.

The half-cells according to Examples 12 to 15 and Comparative Example 3 were evaluated regarding charge and discharge by using a Toscat-3000 series made by Toyo system Inc. The charge and discharge experiment was performed by charging and discharging the half-cells at 0.1 C in a potential region ranging from 1.5V to 3.0V. The results are provided in FIG. 21.

Figure 21:
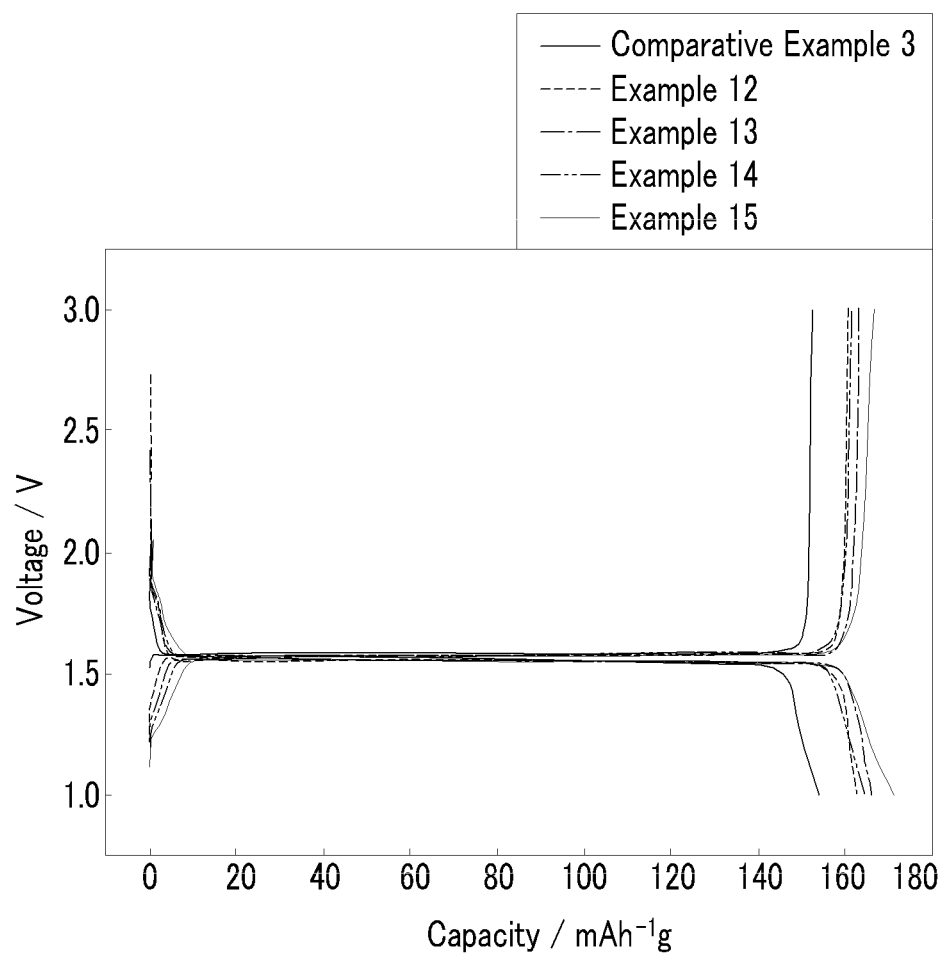
FIG. 21 is a graph showing charge and discharge characteristics of half-cells according to Examples 12 to 15 and Comparative Example 3.

As shown in FIG. 21, the more weight of pitch the battery cells included, the more charge and discharge they had. In other words, the cell of Example 12 had an initial charge capacity of 162.8 mAh/g, the cell of Example 13 had an initial charge capacity of 166.3 mAh/g, the cell of Example 14 had an initial charge capacity of 164.4 mAh/g, and the cell of Example 15 had an initial charge capacity of 170.9 mAh/g, while the cell of Example 12 had an initial discharge capacity of 160.6 mAh/g, the cell of Example 13 had an initial discharge capacity of 163.2 mAh/g, the cell of Example 14 had an initial discharge capacity of 161.3 mAh/g, and the cell of Example 15 had an initial discharge capacity of 166.3 mAh/g. On the contrary, the cell of Comparative Example 3 had a charge capacity of 154.1 mAh/g and a discharge capacity of 151.1 mAh/g. Accordingly, the half-cells according to Examples 12 to 15 had about 5 to 10% improved performance compared with the half-cell according to comparative Example 3.

Figure 22:
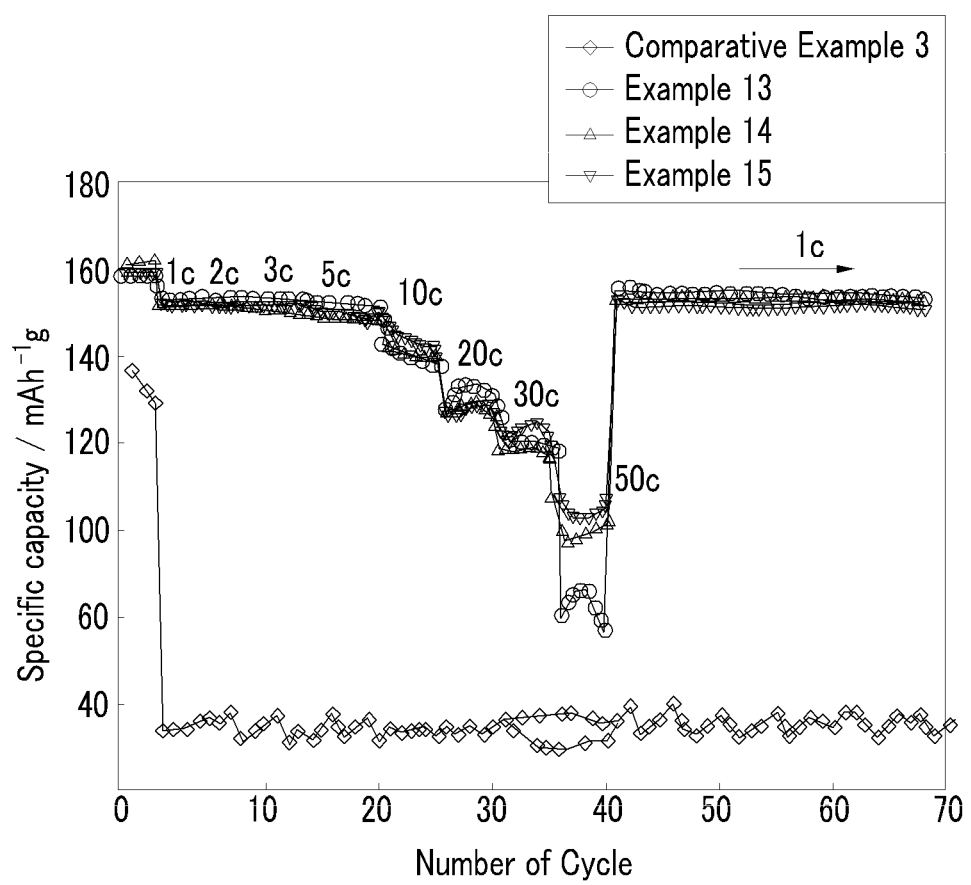
FIG. 22 is a graph showing rate characteristic of half-cells according to Examples 13 to 15 and Comparative Example 3.

Furthermore, the half-cells according to Examples 12 to 15 and Comparative Example 3 were charged and discharged 3 times at 0.2 C in a potential range ranging from 1.0V to 3.0V, then charged and discharged at a discharge rate of 1 C and five times at a charge rate of 1 C, five times at a charge rate of 2 C, five times at a charge rate of 3 C, five times at a charge rate of 5 C, five times at a charge rate of 10 C, five times at a charge rate of 20 C, five times at a charge rate of 30 C, five times at a charge rate of 50 C, and then 28 times at a charge rate of 1 C and measured regarding discharge capacity at each charge and discharge speed. The results of the cells according to Examples 13 to 15 and Comparative Example 3 are provided in FIG. 22. In FIG. 22, the three results shown before the number of cycles being 0 indicated the 3 times charge and discharge result of the half-cell at 0.2 C.

As shown in FIG. 22, when the half-cell of Comparative Example 3 was charged and discharged at 1 C, it had sharply deteriorated discharge capacity. On the contrary, the half-cells according to Examples 13 to 15 had a somewhat deteriorated discharge capacity as the higher charge and discharge rate increased, but remarkably excellent discharge capacity compared with the half-cell according to Comparative Example 3 and almost recovered initial capacity when the cells were charged and discharged at a high rate (up to 50 C) and then at 1 C again.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of manufacturing crystalline titanium dioxide powder, comprising:

preparing a titanyl chloride ($TiOCl_2$) aqueous solution by adding titanium tetrachloride ($TiCl_4$) to water at a temperature ranging from 0° C. to 10° C.;

preparing a mixture by adding alcohol, urea, and a sphere-shaping agent to the titanyl chloride aqueous solution; and hydrothermally synthesizing the mixture under a pressure ranging from 1.5 atm to 5 atm at a temperature ranging from 80° C. to 155° C.

2. The method of claim 1, wherein the hydrothermal synthesis is performed under a pressure ranging from 2 atm to 3 atm.

3. The method of claim 1, wherein the hydrothermal synthesis is performed at a temperature ranging from 90° C. to 100° C.

4. The method of claim 1, wherein the hydrothermal synthesis is performed for 4 to 7 hours.

5. The method of claim 1, wherein the titanyl chloride aqueous solution has a titanium ion concentration ranging from 0.4M to 0.8M.

6. The method of claim 1, wherein the sphere-shaping agent is $(NH_4)_2SO_4$, $NH_4NO_3$, $(NH_4)_2CO_3$, or a combination thereof.

7. The method of claim 1, wherein the mixture comprises urea in a concentration ranging from 1M to 5M.

8. The method of claim 1, wherein the mixture comprises a sphere-shaping agent in a concentration ranging from 0.01M to 0.1M.

9. The method of claim 1, wherein crystalline titanium dioxide powder is further heat-treated at a temperature ranging from 300° C. to 600° C. after the hydrothermal synthesis.

10. The method of claim 1, wherein the crystalline titanium dioxide has an anatase phase.

* * * * *